United States Patent [19]
Kazlas et al.

[11] Patent Number: 5,288,511
[45] Date of Patent: Feb. 22, 1994

[54] SUPERCRITICAL CARBON DIOXIDE DECAFFEINATION OF ACIDIFIED COFFEE

[75] Inventors: Peter T. Kazlas, Allentown; Richard D. Novak, Lansdale; Raymond J. Robey, Macungie, all of Pa.

[73] Assignee: Liquid Carbonic Corporation, Oak Brook, Ill.

[21] Appl. No.: 8,536

[22] Filed: Jan. 25, 1993

Related U.S. Application Data

[63] Continuation-in-part of Ser. No. 799,904, Nov. 26, 1992, abandoned, which is a continuation of Ser. No. 571,749, Aug. 23, 1990, abandoned.

[51] Int. Cl.$^5$ .............................................. A23F 5/20
[52] U.S. Cl. ................................. 426/427; 426/428; 426/595
[58] Field of Search .................... 426/427, 428, 595

[56] References Cited

U.S. PATENT DOCUMENTS

| | | | |
|---|---|---|---|
| 897,763 | 9/1908 | Meyer et al. | 426/427 |
| 897,840 | 9/1908 | Meyers et al. | 426/428 X |
| 953,074 | 3/1910 | Trillich | 426/428 |
| 1,039,961 | 10/1912 | Klein | 426/427 |
| 1,629,512 | 5/1927 | Kundig | 426/427 X |
| 1,964,814 | 7/1934 | Gilbert | 426/428 |
| 4,820,537 | 4/1989 | Katz | 426/427 X |
| 4,911,941 | 3/1990 | Katz et al. | 426/427 |

FOREIGN PATENT DOCUMENTS

| | | | |
|---|---|---|---|
| 0158381 | 10/1985 | European Pat. Off. | 426/428 |
| 247039 | 2/1926 | United Kingdom | 426/428 |
| 362313 | 12/1931 | United Kingdom | 426/427 |

OTHER PUBLICATIONS

Lee, Decaffeinated Coffee Marks 50th Anniversary Tea and Coffee Trade Journal, 1960 (vol. 118, No. 1) pp. 26, 114, 116, 118, 119.
Sivetz et al., Coffee Technology, 1979, Aui: Westport, Connecticut, pp. 582–584, 604.

*Primary Examiner*—Joseph M. Golian
*Attorney, Agent, or Firm*—Fitch, Even, Tabin & Flannery

[57] ABSTRACT

The present invention provides a method of decaffeinating green coffee beans without adversely affecting their acidity or the flavor of coffee beverages produced from them. The invention also relates to a method useful with supercritical decaffeination, in particular with caffeine extraction using supercritical carbon dioxide. In accordance with the invention, green coffee beans are subjected to a treatment by contacting them with an acidic fluid containing an organic acid that is not soluble in supercritical carbon dioxide, preferably an aqueous citric acid solution, prior to or simultaneously with decaffeination.

21 Claims, No Drawings

SUPERCRITICAL CARBON DIOXIDE DECAFFEINATION OF ACIDIFIED COFFEE

REFERENCE TO RELATED APPLICATIONS

This application is a continuation-in-part of application Ser. No. 799,904 filed Nov. 26, 1992, now abandoned, which is a continuation of application Ser. No. 571,749 filed Aug. 23, 1990, now abandoned.

BACKGROUND OF THE INVENTION

This invention relates to decaffeination of green coffee beans. More particularly, this invention relates to treatment of green coffee beans prior to or simultaneously with decaffeination. Still more particularly, this invention relates to treatment of green coffee beans by contacting them with an aqueous organic acid solution in connection with supercritical extraction of caffeine.

Many processes are known for decaffeination of coffee. One particularly preferred process is supercritical extraction of caffeine, typically performed using supercritical carbon dioxide, perhaps with cosolvents such as water or so-called enhancers. Such processes are disclosed, for instance, in U.S. Pat. Nos. 4,820,537 and 4,260,639. Such processes practiced to the present time have suffered in their ability to produce coffee comparable in flavor and aroma to non-decaffeinated coffee.

U.S. Pat. No. 4,911,941 to Katz is directed to a method of continuously decaffeinating moistened green coffee beans with supercritical carbon dioxide. The moistened coffee beans are moved through an extraction vessel and are contacted with continuously flowing supercritical carbon dioxide which extracts caffeine from the green coffee beans. The caffeine-laden supercritical carbon dioxide removed from the caffeine extraction vessel is continuously fed to a countercurrent liquid absorber to remove caffeine, but not the non-caffeine solids. The countercurrent absorber exhibits excellent selectivity for caffeine when contacting supercritical fluids containing caffeine and non-caffeine solids. The essentially caffeine free supercritical fluid contains very nearly the same level of non-caffeine solids as it did upon entering the absorber. The Katz patent teaches that if this supercritical fluid (containing non-caffeine solids at substantially the same level as the supercritical fluid contained upon leaving the decaffeinating extraction chamber) is used as the extraction fluid, the supercritical fluid extracts no measurable amount of non-caffeine solids from the green beans as they are decaffeinated.

The wash water from the absorber can be treated by reverse osmosis to recover a caffeine retentate and a permeate stream containing coffee acids which are soluble in supercritical carbon dioxide and other non-caffeine solids. The permeate can be returned to either the extraction vessel or to the absorbing vessel. At best, the Katz patent teaches that a supercritical carbon dioxide which contains non-caffeine solids at a level that is extracted during the normal extraction process is utilized to extract caffeine from moist green coffee beans, that no further extraction of non-caffeine solids would occur.

While supercritical carbon dioxide is an effective decaffeination medium, its solvent action is not specific to caffeine or caffeine precursors. During supercritical decaffeination of green coffee beans, numerous other components are removed including but not limited to waxes, oils and color bodies. It is known that the pH of a coffee beverage contributes to perceived flavor, and that the range of pH for acceptable palatability is from about 4.95 to about 5.15. Others have attempted to control the pH of the final coffee product, i.e., instant or roast and ground coffee, by adding acidic or alkaline substances to the final coffee product to account for unacceptable pH caused by such factors as the botany of the coffee beans, the altitude at which they are grown, the processing method applied to the coffee fruit, the age of the beans when processed and the degree of roasting. See, e.g., Stivetz, *How Acidity Affects Coffee Flavor*, Food Technology, Vol. 25, No. 5, 1972, pp. 70-77. However, there appears to be no recognition in the art that supercritical decaffeination adversely affects acidity, nor does there appear to be any method disclosed for controlling the acidity of coffee products other than final coffee products.

SUMMARY OF THE INVENTION

It is therefore an object of the present invention to provide a method of decaffeinating green coffee beans without adversely affecting their acidity or the flavor of coffee beverages produced from them. It is a further object of the invention to produce such a method useful with supercritical decaffeination, in particular with caffeine extraction using supercritical carbon dioxide. In accordance with the invention, green coffee beans are subjected to a treatment by contacting them with an acidic fluid containing an organic acid that is not soluble in supercritical carbon dioxide, preferably an aqueous citric acid solution, prior to or simultaneously with decaffeination. These and other objects and features of the invention will become apparent upon review of the following specification and appended claims.

DETAILED DESCRIPTION OF THE PREFERRED EMBODIMENT

The process of the invention comprises treatment of green coffee beans with an acidic fluid which is not soluble in supercritical carbon dioxide and which is capable of being absorbed by the green coffee beans, to provide acidified green coffee beans. The acidified green coffee beans are then subjected to decaffeination by supercritical fluid extraction. In the acidifying step, green coffee beans are contacted with an acidic fluid, preferably an aqueous organic acid solution. It is believed that any acidic fluid containing an acid that is not soluble in supercritical carbon dioxide and is retained with the green coffee beans will be effective in the method of the invention (albeit with possible drawbacks such as cost or toxicity). Upon absorption of the acid, green coffee beans which are acidified to the degree necessary have, after decaffeination, an appropriate acidity such that the final coffee product will produce a coffee beverage having an acceptable "brightness" or acidic character to its flavor. It is preferable to use an aqueous organic acid solution. Suitable acids which are not soluble in supercritical carbon dioxide include citric acid, tartaric acid, malic acid, succinic acid, ascorbic acid, phenylacetic acid and oxalic acid. Of the foregoing, tartaric, citric and malic acids are preferred; oxalic acid is less preferred because it has some toxicity to humans. Because citric acid is highly dissociated in aqueous solution, and because it may be easily and inexpensively obtained in food grades, it is particularly preferred.

The acid treatment is carried out using conditions of time, temperature and acid concentration to achieve the desired acidification of the green coffee beans in view of their natural characteristics and the further processing methods to be employed.

Acid treatment of green coffee beans may be carried out as a pretreatment step prior to decaffeination, where it may be easily controlled and where it may be combined with a moisturizing step typically performed prior to decaffeination.

Since green coffee beans are frequently moisturized by contacting them with water or steam prior to supercritical decaffeination, typically to a moisture content above 20% and usually about 25% to about 50%, the acidifying pretreatment step of the invention is desirably performed during such moisturizing. Accordingly, the pretreatment step is desirably carried out so that when the desired moisture content has been achieved, the desired acidification of the green coffee beans has also been achieved.

After the acidification step, the acidified moist green coffee beans are subjected to decaffeination by extraction with a supercritical fluid. The supercritical extraction step may be performed using known processes, including known supercritical fluids, co-solvents, pressures, temperatures and times. Extraction using supercritical carbon dioxide is especially preferred, since carbon dioxide is relatively inexpensive, effective and does not leave any toxic residues in the decaffeinated beans. Such supercritical extraction may be accomplished using conventional extraction and separation vessels.

Both the acid treatment step and the supercritical extraction step of the invention may be performed in a batch, continuous or pseudo-continuous process.

EXAMPLE 5 pounds of green coffee beans, having a caffeine content of about 1.12% by weight, were steamed for about 15 minutes and loaded into a wetting device which recirculated 3.4 pounds of a 2.0% by weight citric acid/water solution. All percentages used herein are by weight, unless otherwise indicated. The wetting device was designed so that the citric acid solution was fed to a spray head and sprayed over the beans, percolated through them, collected at the bottom, and then pumped back to the spray head. This was performed at about 60° C.–80° C. until the solution had been entirely absorbed into the beans, approximately 45 minutes. The resulting beans had a moisture content of about 45%.

The pretreated green coffee beans were loaded into a basket which was placed inside a supercritical extraction vessel which containing 5 pounds of water in the bottom of the extractor. The beans were suspended about 12 inches above the water level. The extractor was sealed and purged for 5 minutes with carbon dioxide to eliminate any air. The extractor and its associated separator were then brought up to process conditions, namely an extractor temperature of 90° C., an extractor pressure of 280 bar, a separator temperature of 30° C.–40° C., and a separator pressure of 70–80 bar. The extractor charge was subjected to supercritical carbon dioxide with a flow rate of 141 pounds of carbon dioxide per hour for an 8 hour period. During the extraction process, a co-solvent pump was operated at a rate to maintain the water content of the system within ½ pound of its initial value. At the end of the 8 hour supercritical extraction run, the system was slowly depressurized through the separator. The beans were removed from the extractor and dried to a moisture content of about 7%–10%.

Beans treated with the process of the example were analyzed and tested by high performance liquid chromatographic methods which revealed a final caffeine content of 0.043% by weight, which corresponds to a decaffeination level of 96.2%.

Coffee produced by the method of this example and coffee produced by substantially the same method, but without acidic treatment were subjected to evaluation and flavor analysis according to standard techniques. These include preliminary examination of the green coffee beans for color. The beans are then roasted and ground, and the product again evaluated for color. The roast and ground coffee is then brewed by adding boiling water and allowing it to steep. Brewed coffee is then evaluated for flavor, color and aroma by three trained and qualified tasters according to a standard scale containing 13 gradations, including A (best), B9–B5–, C8–C4, D3–D2 and F. The scores provided by the individual tasters are averaged, to produce averaged scores.

Coffees produced according to the method of this example were scored as C-8 and B-5 (acceptable) in several tests. Coffees produced substantially by the method of the example, but without acidic treatment, were scored C-4 (bad).

Any acidification will be of some benefit with green coffee beans which produce excessively alkaline coffee upon decaffeination and further processing into coffee beverage. However, applicants' tests suggest that with typical coffees of the arabica variety using citric acid pretreatment in the manner of the above example, acid concentrations in the range of about 0.25% to about 3.5% by weight are preferred, that citric acid concentrations in the range of 1.0% to about 3.0% by weight are more preferred, and that a citric acid concentration of about 1.5% to about 2.0% is most preferred.

The acid pretreatment process is conveniently carried out at room temperature, however, it will be understood that other temperatures, desirably between about room temperature (20° C.) and about 80° C. may be used. It will also be understood that the desirable degree of acidification will depend on the nature of the green coffee beans to be decaffeinated as well as on the decaffeination process and the process used to convert the acidified decaffeinated coffee beans to a final coffee product.

The degree of acidification may be controlled by the selection of the particular acid used, and the time and temperature at which the beans are contacted by the acid solution.

In the nature of the example above, applicants have found it preferable to contact the green coffee beans with an aqueous organic acid solution of sufficient solution to bean ratio and sufficient acid concentration that when the solution is fully absorbed into the beans, the beans have reached the desired moisture content and desired degree of acidification. The initial moisture content of green coffee beans is generally from about 7% to about 10% b weight. The desired moisture content by weight after treatment with the aqueous organic acid solution is preferably above about 20%, more preferably between about 25% and about 45%, and most preferably between about 30% and about 35%, i.e., a ratio of aqueous acidic solution to green coffee beans of from about 1:4 to about 1:1, preferably about 1:3 to about 1:1, and most preferably 1:2.3 to about 1:1.22.

With the preferred acid solution, aqueous citric acid solution and with pretreatment of the beans to achieve a moisture content of about 30% to 45%, the solution is preferably between about 0.25% and about 3.5%, and more preferably between about 1.0% and 3.0%, most preferably about 1.5% and about 2.0% citric acid by weight. The citric acid solutions have a pH of 2.70 and 2.11 at citric acid concentrations of 0.25% and 3.5%, respectively. A preferred pH range is from about 2 to about 3. If other acids are used, their concentration in the solution may be adjusted so that the hydrogen ion concentration in the pretreatment solution is equivalent to that of the citric acid solutions specified above, whereby solutions which are equivalent in their acidification of the beans may be obtained.

While control of the pretreatment process is easiest when a batch process is used with fixed initial quantities of solution and beans and the treatment is carried out until the solution is fully absorbed, or in a batch or continuous process wherein quantities of solution in excess of the amount which may be absorbed into the beans are used and the process is carried out until the acid concentration in the beans is the same as the acid concentration in the solution, it will be understood that other methods may be used. For instance, acid solutions of higher hydrogen ion concentration than the citric acid solutions specified above may be used, and the pretreatment process conducted for a time shorter than that necessary to reach equilibrium. Such methods may, however, require other steps to achieve desired moisture content.

As indicated above, green coffee beans are often steamed prior to decaffeination. In addition to moisturizing the beans, the steaming steps swells beans to a greater extent than moisturizing by soaking, and thus makes subsequent caffeine extraction easier. Applicant has found it advantageous to both steam and soak the beans, preferably simultaneously. Accordingly, in a preferred embodiment of the invention, the beans are subjected to pretreatment comprising simultaneously subjecting them to a flow of steam and contacting them with an acidic fluid. This may be accomplished by loading a vessel with a charge of beans, supplying steam to an inlet near the bottom of the vessel, withdrawing steam from an outlet near the top of the vessel, withdrawing steam from an outlet near the top of the vessel, and spraying acidic fluid such as aqueous citric acid solution over the beans from a spray head near the top of the vessel. Acidic fluid collecting in the bottom of the vessel after passing over the beans may be recirculated to the spray head.

As indicated, decaffeination of the pretreated acidified green coffee beans is preferably accomplished by a supercritical extraction step using supercritical carbon dioxide, most preferably using moist carbon dioxide, i.e., using water as a co-solvent. Applicants believe that the extraction step is preferably carried out at a pressure in excess of about 200 bar, more preferably at a pressure in excess of about 240 bar, and most preferably at a pressure between about 250 bar and about 310 bar. The extraction step is carried out at a temperature above the critical temperature of 31° C. for carbon dioxide, more preferably at a temperature between about 60° C. and about 120° C. and most preferably at a temperature between about 70° C. and about 110° C. The extraction is preferably carried out with a solvent/feed ratio of between about 50:1 and 300:1, and most preferably between about 75:1 and about 275:1. The specified extraction parameters are desirable primarily because of ease and effectiveness of the extraction step itself, rather than because of a relationship with the acidifying pretreatment step.

In a particularly preferred decaffeination process, the green coffee beans are subjected to moist supercritical carbon dioxide as described above, wherein the supercritical fluid is passed through an acidic fluid prior to contacting the beans. For instance, a volume of acidic fluid, such as aqueous citric acid, may be maintained in the bottom of the extraction vessel. Supercritical carbon dioxide may be introduced into the bottom of the vessel, whereupon it bubbles through the citric acid solution, entraining citric acid as well as water.

Decaffeination of coffee is desirably preferred until at least about 90% and more preferably at least about 97% by weight of the caffeine content is removed. Since green coffee beans typically contain from about 0.6% to about 3.0% caffeine by weight, the decaffeination process in accordance with the present invention is preferably carried out until the caffeine content of the beans is less than about 0.3% by weight, and more preferably until the caffeine content is less than about 0.1% by weight.

Supercritical carbon dioxide is the preferred process for decaffeination used in the present invention. It is also the process which, to the applicants' knowledge, is the most selective, i.e., most effective in removing caffeine but not other compounds from the green coffee beans. Accordingly, it is believed that the acidic treatment of the present invention will also be beneficial in connection with decaffeination using other processes which remove substantial amounts of non-caffeine compounds from green coffee beans. Such other known decaffeination processes include the methylene chloride process, the ethyl acetate process, the water-based process, and the process known as the "Nestle" or coffee oil process. Moreover, it is believed that such other decaffeination processes may lend themselves to simultaneous acidification and decaffeination. For instance, in a modified water-based process, the green coffee beans may be acidified during decaffeination by use of an aqueous acidic extraction fluid.

It is therefore seen that the process of the invention is useful in connection with green coffee beans and decaffeination processes which would otherwise produce decaffeinated beans which when used to make coffee would result in a too-alkaline beverage. While particular embodiments have been described, variations will no doubt occur to those skilled in the art without departing from the spirit and scope of the invention.

What is claimed is:

1. A method of treating green coffee beans comprising contacting green coffee beans with an aqueous solution of an organic acid which is insoluble in supercritical carbon dioxide, said organic acid being selected from the group consisting of tartaric acid, citric acid, malic acid, succinic acid, ascorbic acid, phenylacetic acid and oxalic acid, maintaining said green coffee beans in contact with said aqueous solution until a predetermined degree of acidification of said green coffee beans has occurred by absorption of said aqueous solution by said green coffee beans, said predetermined degree of acidification being that obtained which is equivalent to the use of a citric acid solution which has a citric acid concentration of between about 0.25% and about 3.0% by weight and the weight ratio of citric acid solution to green coffee beans is from about 1:3 to about 1:1 and decaffeinating said acidified green coffee beans by extraction with supercritical carbon dioxide.

2. A method according to claim 1, wherein said organic acid is citric acid.

3. A method according to claim 1, wherein said green coffee beans are maintained in contact with said aqueous acid solution until the moisture content of said green coffee beans is about 20% by weight.

4. A method according to claim 1, wherein said green coffee beans are maintained in contact with said aqueous acid solution until the moisture content of said green coffee beans is between about 20% and about 50% by weight.

5. A method according to claim 1, wherein said green coffee beans are maintained in contact with said aqueous acid solution until the moisture content of said green coffee beans is between about 30% and about 45% by weight.

6. A method according to claim 1, wherein said maintaining step comprises circulating said aqueous acid solution over said green coffee beans until said aqueous acid solution is substantially fully absorbed by said green coffee beans.

7. A method according to claim 1, wherein said maintaining step comprises circulating said aqueous acid solution over said green coffee beans until the acid concentration in said beans is substantially the same as that in said solution.

8. A method according to claim 1, wherein said green coffee beans are thereafter subjected to a roasting step.

9. A method according to claim 1, wherein said roast coffee beans are thereafter processed into a final coffee product.

10. A method according to claim 1, further comprising the step of contacting said green coffee beans with steam.

11. A method according to claim 10, wherein said steps of contacting with said aqueous solution and contacting with steam are performed simultaneously.

12. A method according to claim 10, wherein said contacting steps are performed by placing said green coffee beans in a vessel, introducing steam into said vessel through an inlet adjacent to the bottom of said vessel, and contacting said green coffee beans with a spray of said aqueous acid solution from a spray head adjacent to the top of said vessel.

13. A method according to claim 12, wherein said steps of contacting with an acidic fluid and contacting with steam are performed simultaneously.

14. A method according to claim 1, wherein said supercritical carbon dioxide comprises a mixture of carbon dioxide and water.

15. A method according to claim 1, wherein said supercritical carbon dioxide has a pressure in excess of about 200 bar.

16. A method according to claim 1, wherein said supercritical carbon dioxide has a pressure in excess of 240 bar.

17. A method according to claim 1, wherein said supercritical carbon dioxide has a pressure between about 250 bar and 310 bar.

18. A method according to claim 1, wherein said supercritical carbon dioxide has a temperature between about 60° C. and about 120° C.

19. A method according to claim 1, wherein said supercritical carbon dioxide has a temperature between about 70° C. and about 110° C.

20. A method according to claim 1, wherein said extracting step is performed with a weight ratio of supercritical carbon dioxide to green coffee beans of between about 50:1 and about 300:1.

21. A method according to claim 20, wherein said weight ratio is between about 75:1 and about 275:1.

* * * * *

UNITED STATES PATENT AND TRADEMARK OFFICE
CERTIFICATE OF CORRECTION

PATENT NO. : 5,288,511
DATED : February 22, 1994
INVENTOR(S) : Kazlas, et al.

It is certified that error appears in the above-indentified patent and that said Letters Patent is hereby corrected as shown below:

On the title page, [63], change "November 26, 1992" to --November 26, 1991".

Signed and Sealed this

Seventh Day of February, 1995

Attest:

BRUCE LEHMAN

Attesting Officer      Commissioner of Patents and Trademarks